United States Patent [19]
Shiau et al.

[11] Patent Number: 5,880,857
[45] Date of Patent: Mar. 9, 1999

[54] ERROR DIFFUSION PATTERN SHIFTING REDUCTION THROUGH PROGRAMMABLE THRESHOLD PERTURBATION

[75] Inventors: Jeng-Nan Shiau, Webster; Leon C. Williams, Walworth; David J. Metcalfe, Marion, all of N.Y.

[73] Assignee: Xerox Corporation, Stamford

[21] Appl. No.: 728,416

[22] Filed: Oct. 10, 1996

Related U.S. Application Data

[63] Continuation of Ser. No. 347,971, Dec. 1, 1994, abandoned.
[51] Int. Cl.$^6$ .................................................. G06K 9/00
[52] U.S. Cl. ................................. 358/456; 358/465
[58] Field of Search .................... 358/455–456, 358/468, 462–463, 465–466

[56] References Cited

U.S. PATENT DOCUMENTS

| | | | |
|---|---|---|---|
| 3,681,650 | 8/1972 | Koll | 315/30 |
| 5,060,284 | 10/1991 | Klees | 382/53 |
| 5,243,445 | 9/1993 | Koike | 358/462 |
| 5,404,176 | 4/1995 | Lum et al. | 348/574 |
| 5,506,699 | 4/1996 | Wong | 358/456 |
| 5,530,561 | 6/1996 | Shimazaki | 358/455 |

FOREIGN PATENT DOCUMENTS 0 507 356 A2  10/1992  European Pat. Off. .
0 544 511 A2  6/1993  European Pat. Off. .

OTHER PUBLICATIONS

Billotet–Hoffmann et al., "On The Error Diffusion Technique For Electronic Halftoning", vol. 24, No. 3, 1983, pp. 253–258.

H. Kotera et al., "A Poster–Size Color Ink–Jet Printing System", vol. 25, No. 4, 1984, pp. 321–329.

*Primary Examiner*—David K. Moore
*Assistant Examiner*—Stephen Brinich
*Attorney, Agent, or Firm*—Michael J. Nickerson

[57] ABSTRACT

A process eliminates pattern shifting artifacts in a printed image by perturbing a threshold/image signal value relationship when a multi-level grey level is binarized. The process utilizes a programmable multi-level grey signal modifying circuit for modifying the multi-level grey signal by a predetermined value according to its grey level. The modified multi-level grey signal is binarized to a binary pixel signal according to a relationship between the modified multi-level grey signal and a threshold value. The process further generates an error corresponding to the relationship and diffuses the error to neighboring pixels. The multi-level grey signal is modified with either random noise multiplied by a grey level dependent coefficient or by a predetermined value from a checkerboard or vertical line pattern. The value from the pattern is dependent upon the grey level and pixel location of the image data.

21 Claims, 12 Drawing Sheets

= BLACK

= WHITE

ERROR DIFFUSION PATTERN SHIFTING REDUCTION THROUGH PROGRAMMABLE THRESHOLD PERTURBATION

This application is a continuation of application Ser. No. 08/347,971, filed Dec. 1, 1994, now abandoned.

FIELD OF THE PRESENT INVENTION

The present invention is directed to a system and method for reducing error diffusion pattern shifting at certain grey levels. More specifically, the present invention is directed to the reduction of error diffusion pattern shifting in certain grey levels by perturbing the threshold value used to binarize the image data.

BACKGROUND OF THE PRESENT INVENTION

There are many methods of rendering grey images on an output device. One such example is error diffusion. Error diffusion can render complex images that contain a mixture of text and picture reasonably well. The utilization of error diffusion eliminates the need to have image segmentation to separate the text from the picture so that the picture aspect of the document can be screened and the text aspect of the document can be threshold.

FIG. 1 illustrates a typical error diffusion binarization circuit. In FIG. 1, a modified video signal is fed to a comparator 1 which compares the modified video signal to a threshold value. The comparator 1 outputs a logic one when the modified video signal has a value greater than or equal to the threshold value and outputs a logic zero when the modified video signal has a value less than the threshold value. Depending on whether the rendering device connected to this error diffusion binarization circuit is a write white system or a write black system, the logic value of the output from the comparator 1 will cause the rendering device to produce a pixel or not.

In addition to producing the binary value for the rendering device, the comparator 1 produces an error value. The error value is the modified video signal value when the modified video signal has a value less than the threshold value, or the error value is equal to the modified video signal value minus the maximum video value when the modified video signal has a value greater than or equal to the threshold value. The error is diffused to downstream pixels, the next pixel in the same scanline and pixels in the next scanline. This error is then accumulated for each pixel such that when a particular pixel is to be processed by the error diffusion binarization circuit, the accumulated error value for the particular pixel is added to the incoming video signal corresponding to the particular pixel to produce the modified video signal being fed into comparator 1.

One problem associated with the utilization of error diffusion in rendering an image on a document is the occurrence of periodically repeating patterns. These patterns occur most notably at the grey levels of 85, 128, and 170 when an 8 bit data word is utilized to represent the grey level of the image data. For example, when the grey level input is 128, the binarized image can alternate between a checkerboard pattern and a vertical line pattern. Depending on the printer spot size and the grey level at which the spot was mapped, the vertical line pattern can appear lighter than the checkered board pattern, thereby producing a undesired artifact.

The idea of dithering or adding threshold perturbations to defeat visual artifacts of a regular and deterministic nature has been utilized in the prior art. For example, in the article "Digital Halftoning" by Robert Ulichney, it was proposed to add random noise, across the entire image, to the elements of the error weights or to the threshold to defeat the visual artifacts discussed above However, by adding noise to all parts of an image tends to degrade the image and will also destroy the dot pattern established in the highlight and shadow areas.

Therefore, it is desirable to perturb only the threshold in those areas where the occurrence of periodically repeating patterns are distracting. More specifically, it is desirable to eliminate pattern shifting artifacts by making one of the patterns much less likely to occur. On the other hand, it is desirable to mask this artifact by making the transitions between the patterns happen more frequently, thereby breaking up the regular patterns.

SUMMARY OF THE PRESENT INVENTION

One aspect of the present invention is a system for processing image data having a multi-level grey signal having a first number of grey levels. The system includes threshold means for generating a threshold value and conversion means for generating an output having a second number of grey levels based on a relationship between the threshold value and the multi-level grey signal. The second number of grey levels being less than the first number of grey levels. Perturbing means perturbs the relationship between the threshold value and the multi-level grey signal according to a grey level of the multi-level grey signal, thereby effecting the output from the conversion means.

Another aspect of the present invention is a method for processing image data having a multi-level grey signal having a first number of grey levels. The method generates a threshold value and generates an output having a second number of grey levels based on a relationship between the threshold value and the multi-level grey value. The second number of grey levels being less than the first number of grey levels. The relationship between the threshold value and the multi-level grey signal is perturbed according to a grey level of the multi-level grey signal, thereby effecting the output.

A third aspect of the present invention is a system for eliminating pattern shifting artifacts in a printed image. The system includes image means for generating image data having a multi-level grey signal and programmable multi-level grey signal modifying means for modifying the multi-level grey signal by a predetermined value according to the grey level. Binary means outputs a binary pixel value according to a relationship between the modified multi-level grey signal and a threshold value and generates an error corresponding to the relationship. The binary means diffuses the error to neighboring pixels.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purpose only and should not be limitative of the scope of the present invention wherein.

DETAILED DESCRIPTION OF THE DRAWINGS

Figure 1:
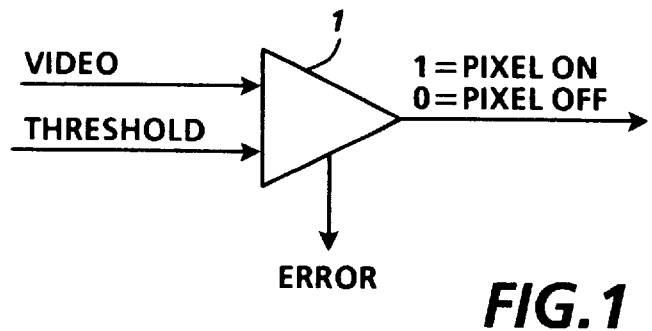
FIG. 1 shows a block diagram illustrating a circuit utilized in the prior art to binarize image data.

The following will be a detailed description of the drawings illustrating the present invention. In this description, as well as in the drawings, like reference numerals represent the devices, circuits, or circuits performing the same or equivalent functions.

Figure 2:
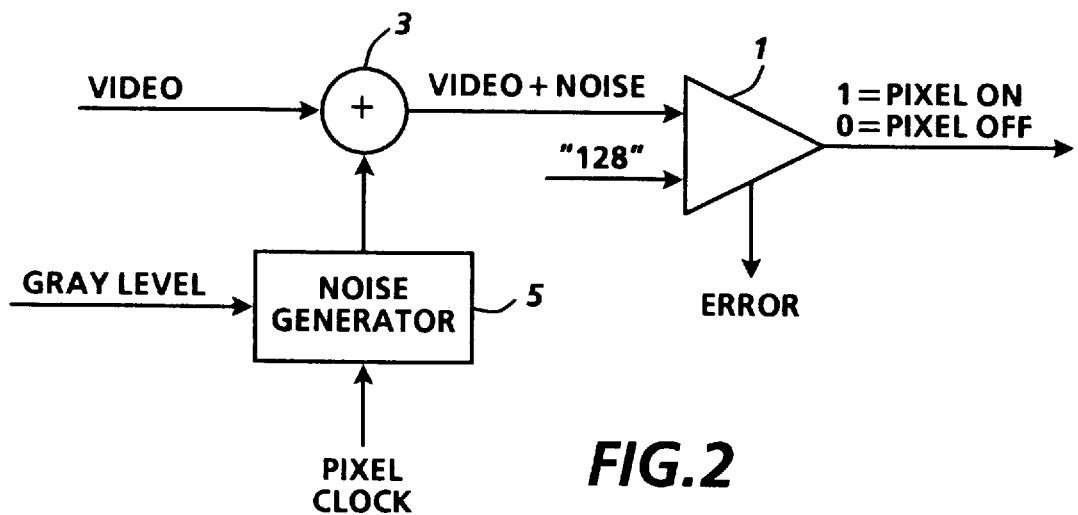
FIG. 2 shows a block diagram illustrating one embodiment of the present invention which perturbs the threshold by adding random noise.

FIG. 2 illustrates one embodiment of the present invention which perturbs a threshold relationship between a modified video image signal and a threshold signal by adding random noise to an error diffusion modified video or image signal in an error diffusion binarization system. In FIG. 2, a random noise generator 5 produces a random noise signal which is added to the error diffusion modified image signal by adder 3. The random noise produced by the noise generator 5 is a function of the grey level of the image to be threshold. More specifically, in the preferred embodiment of the present invention, if the grey level to be threshold represent either 128, 85, or 64, when utilizing an 8 bit data word to represent a grey level of the image data, the random noise generator 5 will produce some random noise level which will be added to the image or video signal. It is noted that these selected grey levels correspond to the preferred embodiment of the present invention, but any other desired grey level can be utilized to trigger the generation of the random noise to be added to the image or video signal.

The modified video or image signal outputted by the adder 3 is then binarized by comparator circuit 1. The comparator circuit 1 compares the modified video or image signal with a threshold value, in the preferred embodiment the threshold value is 128. If the modified video or image signal is greater than or equal to 128, the comparator outputs a logical value of 1 indicating that the pixel is ON or if the modified video or image signal is less than 128, the comparator circuit 1 output a logical 0 representing that the pixel is OFF.

An error is generated from this binarization process wherein this error is diffused to adjacent pixels utilizing any conventional error diffusion process. In the preferred embodiment of the present invention, the error diffusion process is the processes disclosed co-pending U.S. patent applications, Ser. No. 08/285,265; 08/285,572; and 08/285,324. The entire contents of these co-pending US patent applications are hereby incorporated by reference. It is noted that the video signal entering the adder 3 is initially modified to include any error diffused to that pixel from previous binarization processes.

Figure 3:
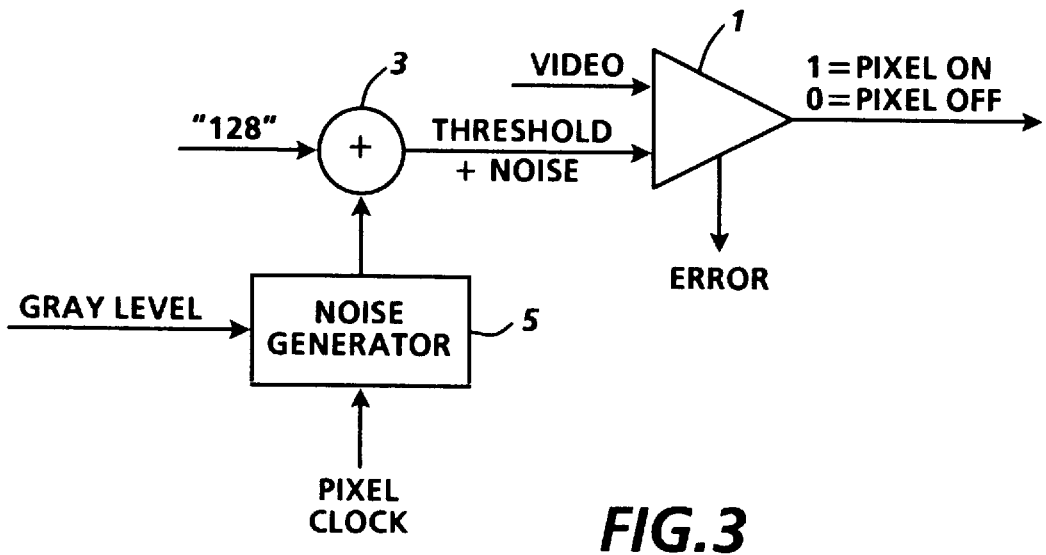
FIG. 3 shows a block diagram illustrating another embodiment of the present invention which adds random noise to perturb the threshold.

FIG. 3 illustrates a variation of the embodiment of the present invention illustrated in FIG. 2. In this embodiment, the present invention perturbs a threshold relationship between an error diffusion modified video image signal and a threshold signal by adding random noise to the threshold signal. In FIG. 3, a random noise generator 5 produces a random noise signal which is added to the threshold signal by adder 3. The random noise produced by the noise generator 5 is a function of the grey level of the image to be threshold. The remaining aspects or function illustrated by FIG. 3 are the same as those described above with respect to FIG. 2.

Figure 4:
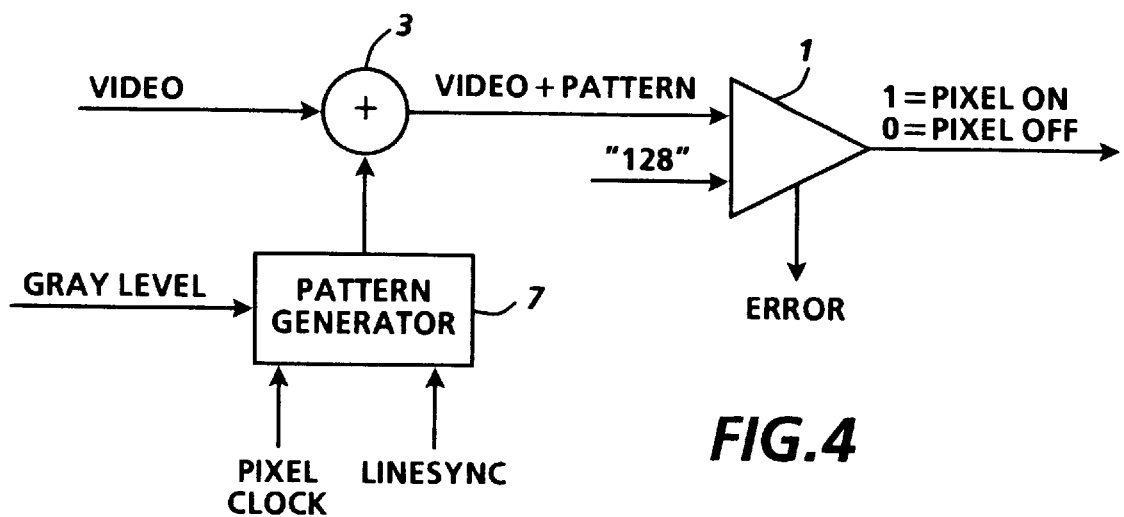
FIG. 4 shows a block diagram illustrating a third embodiment of the present invention which perturbs the threshold by injecting a predetermined pattern.

FIG. 4 illustrates another embodiment of the present invention which perturbs a threshold relationship between a modified video image signal and a threshold signal by adding a predetermined pattern to an error diffusion modified video signal. In the preferred embodiment, the pattern injected into the error diffusion modified video signal is either a checkerboard pattern as shown in Tables 1 and 2 below or a vertical line pattern as shown in Tables 3 and 4 below.

In FIG. 4, a pattern generator 7 produces one of the patterns described above which is added to the error diffusion modified video signal signal by adder 3. The pattern is stored in a look-up table wherein the exact pattern values are determined by the grey level value of the error diffusion modified video signal, a pixel clock signal, and a linesync signal. This way the proper pattern value is matched with the correct pixel of the incoming video signal. The remaining aspects or function illustrated by FIG. 4 are the same as those described above with respect to FIG. 2.

Figure 5:
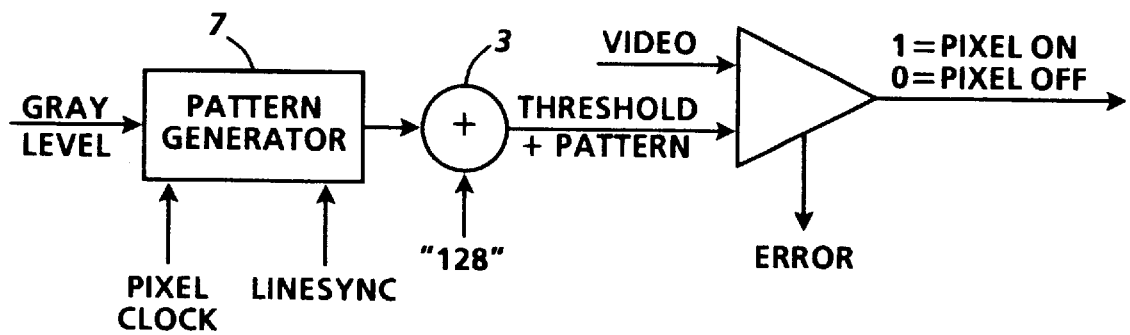
FIG. 5 shows a block diagram illustrating a fourth embodiment of the present invention which perturbs the threshold by injecting a predetermined pattern.

FIG. 5 illustrates still another embodiment of the present invention which perturbs a threshold relationship between a modified video image signal and a threshold signal by adding a predetermined pattern to a threshold signal. In the preferred embodiment, the pattern injected into the threshold signal is either a checkerboard pattern as shown in Tables 1 and 2 below or a vertical line pattern as shown in Tables 3 and 4 below.

In FIG. 5, a pattern generator 7 produces one of the patterns described above which is added to the threshold signal by adder 3. The pattern is stored in a look-up table wherein the exact pattern values are determined by the grey level value of the error diffusion modified video signal, a pixel clock signal, and a linesync signal. This way the proper pattern value is matched with the correct pixel of the incoming video signal. The remaining aspects or function illustrated by FIG. 5 are the same as those described above with respect to FIG. 2.

Figure 6:
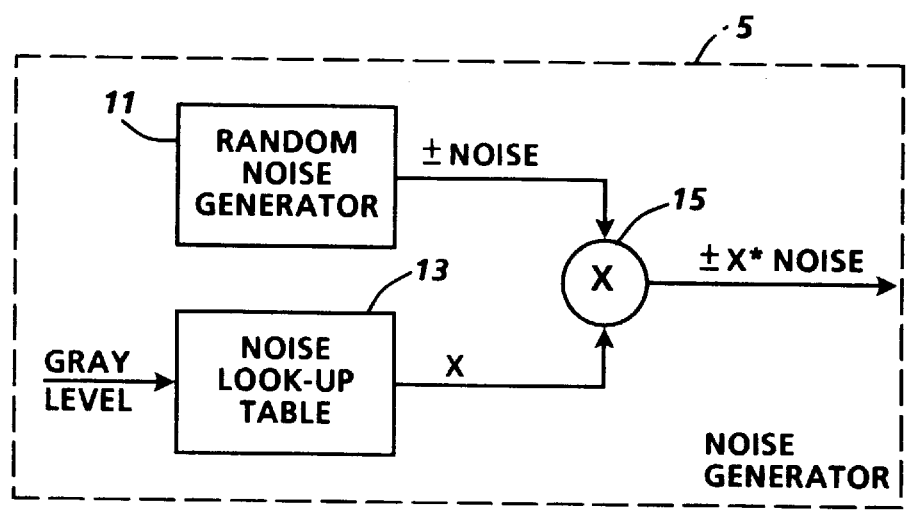
FIG. 6 shows a block diagram illustrating a noise generator utilized in the preferred embodiment of the present invention.

FIG. 6 illustrates a random noise generator as utilized in the preferred embodiment of the present invention. The random noise generator circuit 5 includes a random noise generator 11 which produces a random noise signal which is fed to a multiplier 15. In the preferred embodiment, the random number generated by the random noise generator 11 is uniformly distributed between plus or minus 255 with a period of over 14 million.

The noise generator circuit 5 also includes a noise look-up table 13 which outputs a coefficient corresponding to the grey level information received by the look-up table. For example, in the preferred embodiment of the present invention, if the inputted grey level is 128 on an 8 bit scale, the coefficient generated by the noise look-up table is 1. On the other hand, if the grey value is 85, the coefficient generated by the noise look-up table is 0.5. In other words, each grey value has assigned thereto a coefficient. The coefficient can be a value as low as $1/256$.

The look-up table 13 programs or tailors the amplitude of the random noise added to the threshold or image signal as a function of the input grey level. The noise look-up table 13 holds N-bit fraction numbers, coefficients, (as a function of input grey levels) which are multiplied with the random noise (number) generated by the random noise generator 11 and later added to the threshold or image signal value. Any noise profile can be loaded into the look-up table to selectively vary the location and magnitude of the threshold permutation in order to disrupt the periodicity of any objectional pattern.

Figure 17:
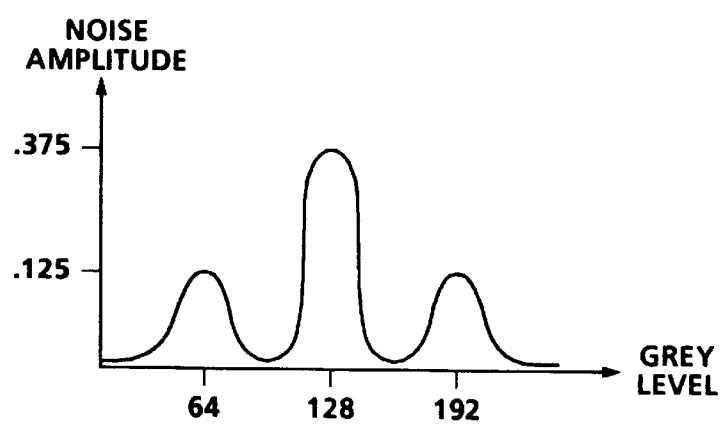
FIG. 17 illustrates a graph showing a preferred relationship between the noise amplitude coefficients and the grey level values of the video signal.

A preferred pattern or relationship is illustrated in FIG. 17. In FIG. 17, the graph shows the relationship between the noise coefficients and the grey level values. For example, in one embodiment, the noise amplitude coefficient at grey level value 128 is 0.375 and the noise amplitude coefficients at grey level values 64 and 192 are 0.125. These values can be adjusted to reflect the particular properties of the printing device. Moreover, the pattern is not limited to a three peak pattern. The pattern may have a multitude of peaks.

The coefficient from the look-up table 13 is fed to the multiplier 15 which multiplies the coefficient and the noise signal generated by the random noise generator 11. The product of this multiplication is the actual random noise signal fed to the adders in FIGS. 2 and 3.

Figure 7:
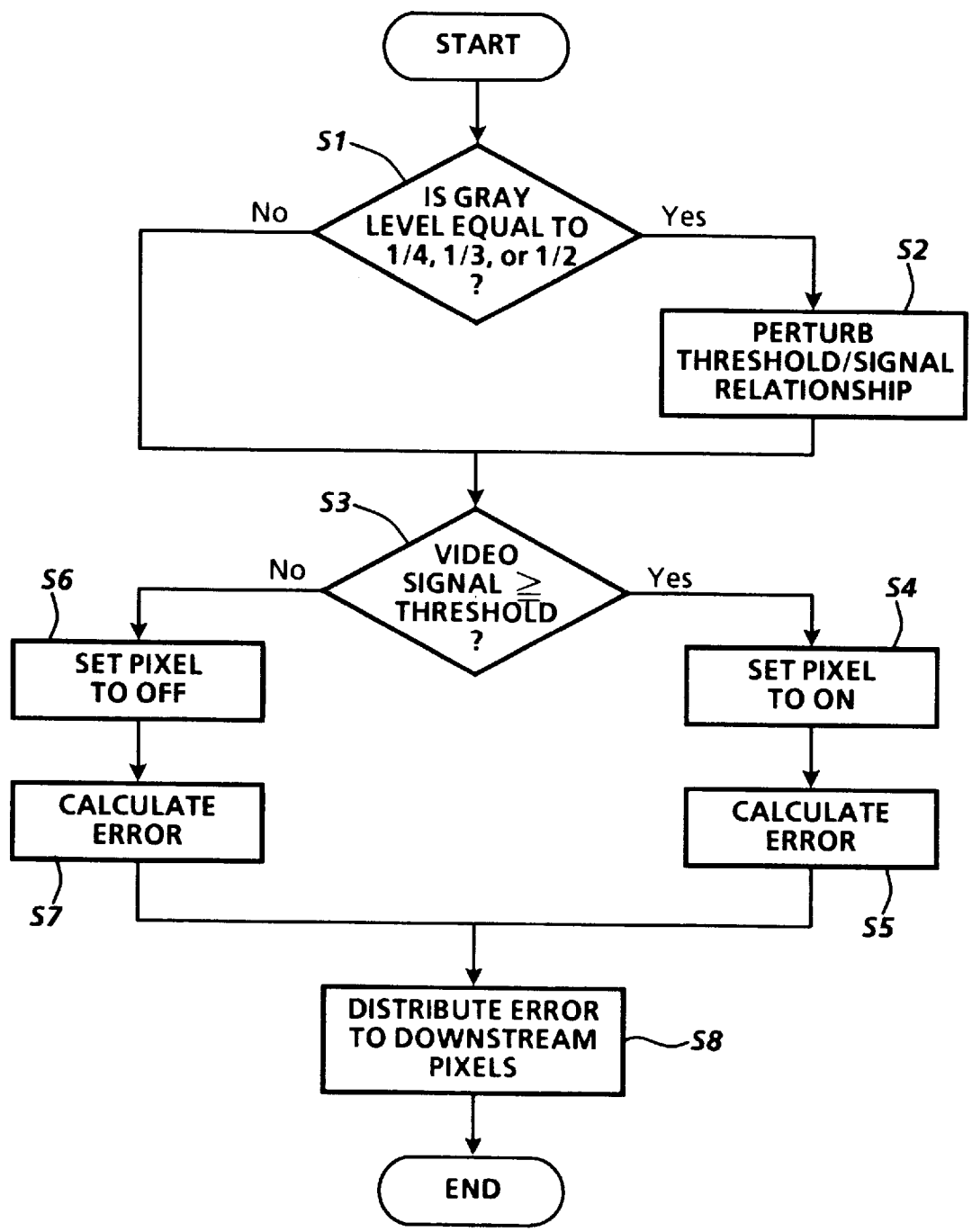
FIG. 7 shows a flowchart illustrating the perturbing of the threshold according to the concepts of the present invention.

FIG. 7 illustrates the general conceptual method utilized by the present invention to perturb the threshold relationship at certain grey levels. As illustrated in FIG. 7, at Step S1, it is determined whether the grey level of the image to be threshold is equal to ¼, ⅓, or ½. If the image data is equal to one of these grey levels, the threshold/signal relationship is perturbed at Step S2. After the threshold signal relationship has been perturbed at Step S2 or if the image data has a grey level not equal to ¼, ⅓, or ½, it is determined whether the video signal is greater than or equal to the threshold value at Step S3. If the video signal is greater than or equal to the threshold value, Step S4 sets the pixel value to be ON and Step S5 calculates the error to be utilized in the error diffusion process. However, if the video signal is less than the threshold value, Step S6 sets the pixel value to be OFF and the error is calculated in Step S7 to be utilized in the error diffusion process. After calculating the error in Step S5 or S7, the process distributes the error to downstream pixels in Step S8.

Figure 8:
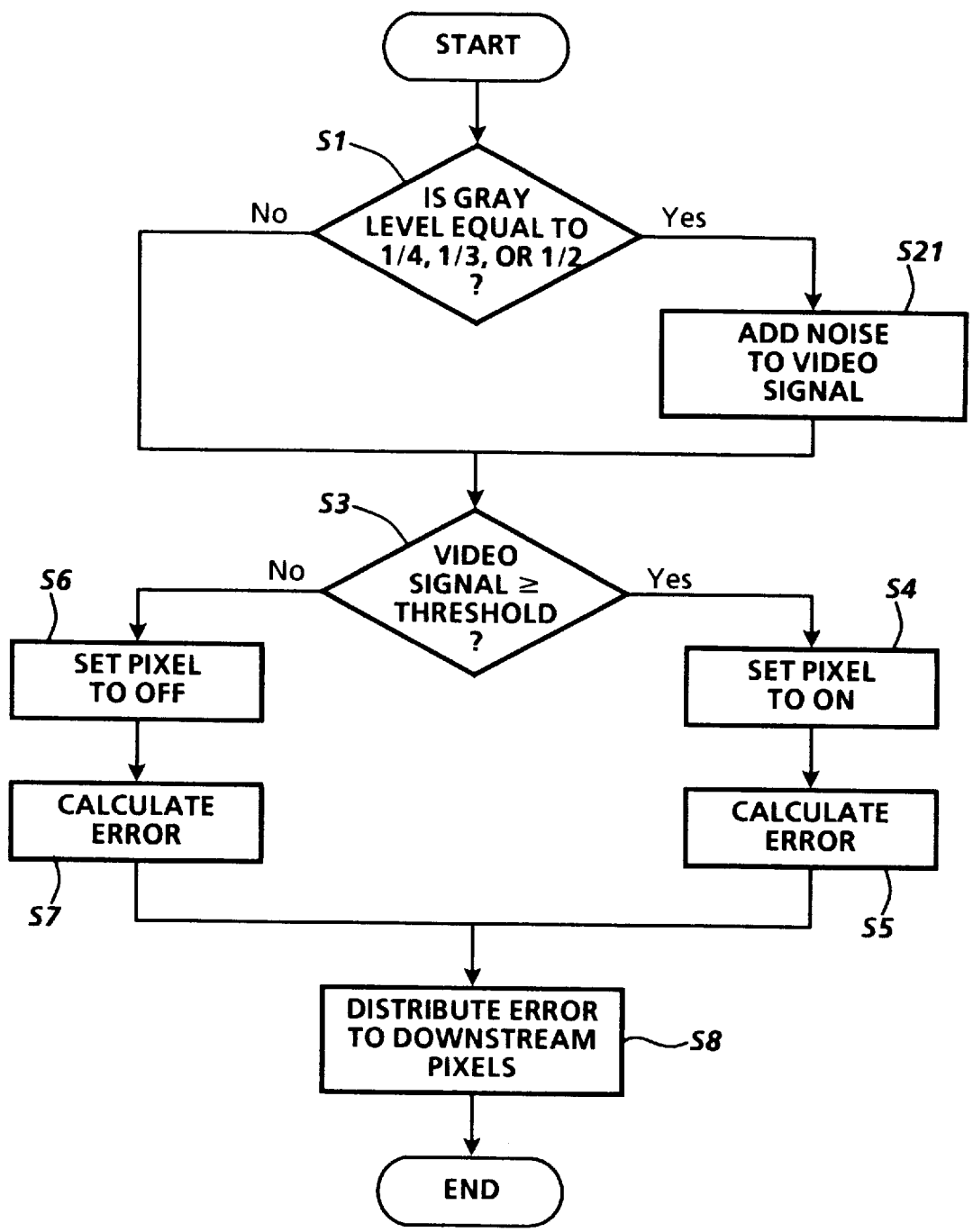
FIG. 8 shows a flowchart illustrating the adding of random noise to the image signal to perturb the threshold according to the concepts of the present invention.

FIG. 8 illustrates a particular method utilized by the present invention to perturb the threshold relationship at certain grey levels. As illustrated in FIG. 8, at Step S1, it is determined whether the grey level of the image to be threshold is equal to ¼, ⅓, or ½. If the image data is equal to one of these grey levels, random noise is added to the video signal to perturb the threshold/image signal relationship at Step S21. After the threshold signal relationship has been perturbed at Step S21 or if the image data has a grey level not equal to ¼, ⅓, or ½, it is determined whether the video signal is greater than or equal to the threshold value at Step S3. The remaining steps are the same as described above with respect to FIG. 7.

Figure 9:
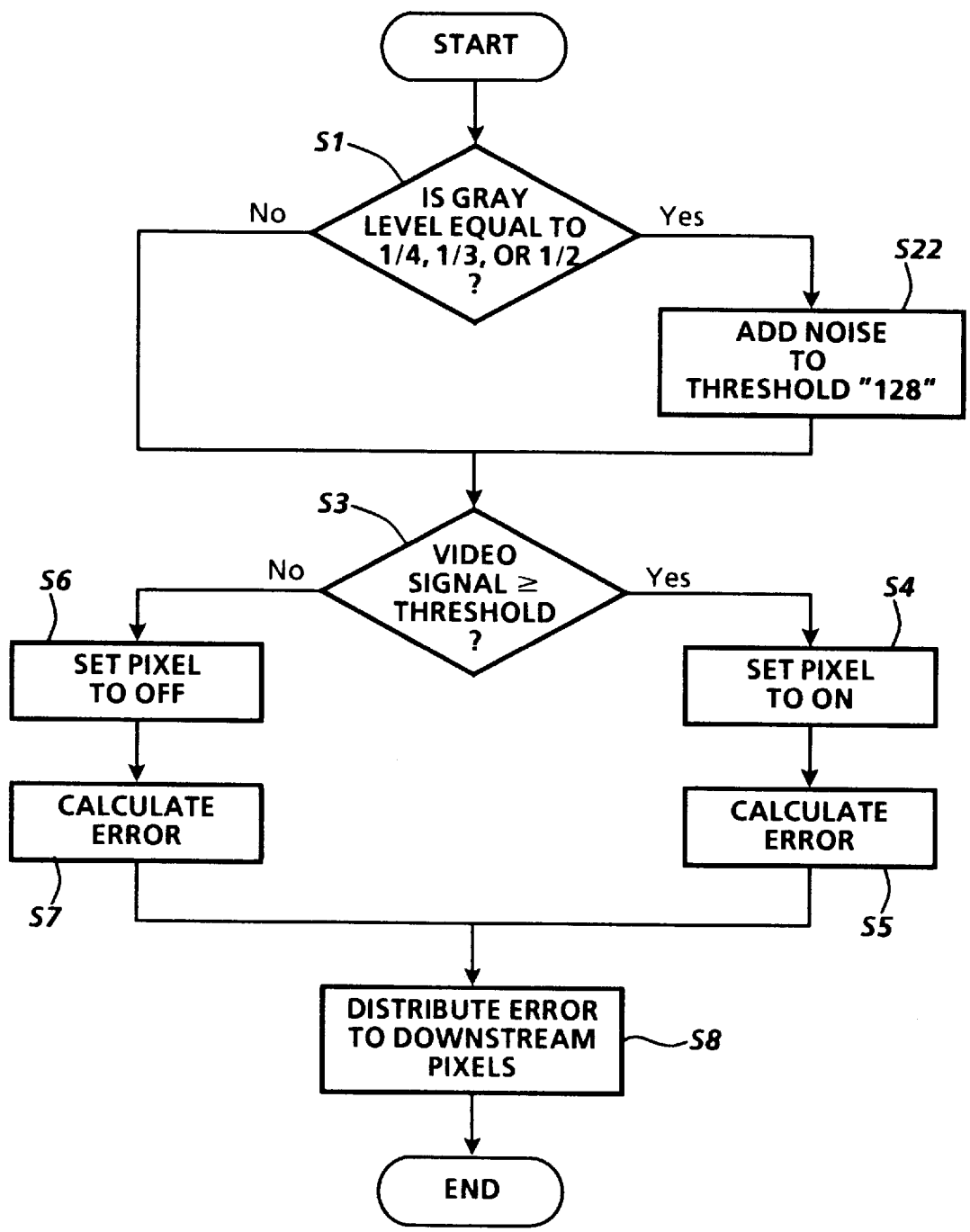
FIG. 9 shows a flowchart illustrating the addition of random noise to the threshold signal to perturb the threshold relationship according to the concepts of the present invention.

FIG. 9 illustrates another method utilized by the present invention to perturb the threshold relationship at certain grey levels. As illustrated in FIG. 9, at Step S1, it is determined whether the grey level of the image to be threshold is equal to ¼, ⅓, or ½. If the image data is equal to one of these grey levels, random noise is added to the threshold signal to perturb the threshold/image signal relationship at Step S22. After the threshold signal relationship has been perturbed at Step S22 or if the image data has a grey level not equal to ¼, ⅓, or ½, it is determined whether the video signal is greater than or equal to the threshold value at Step S3. The remaining steps are the same as described above with respect to FIG. 7.

Figure 10:
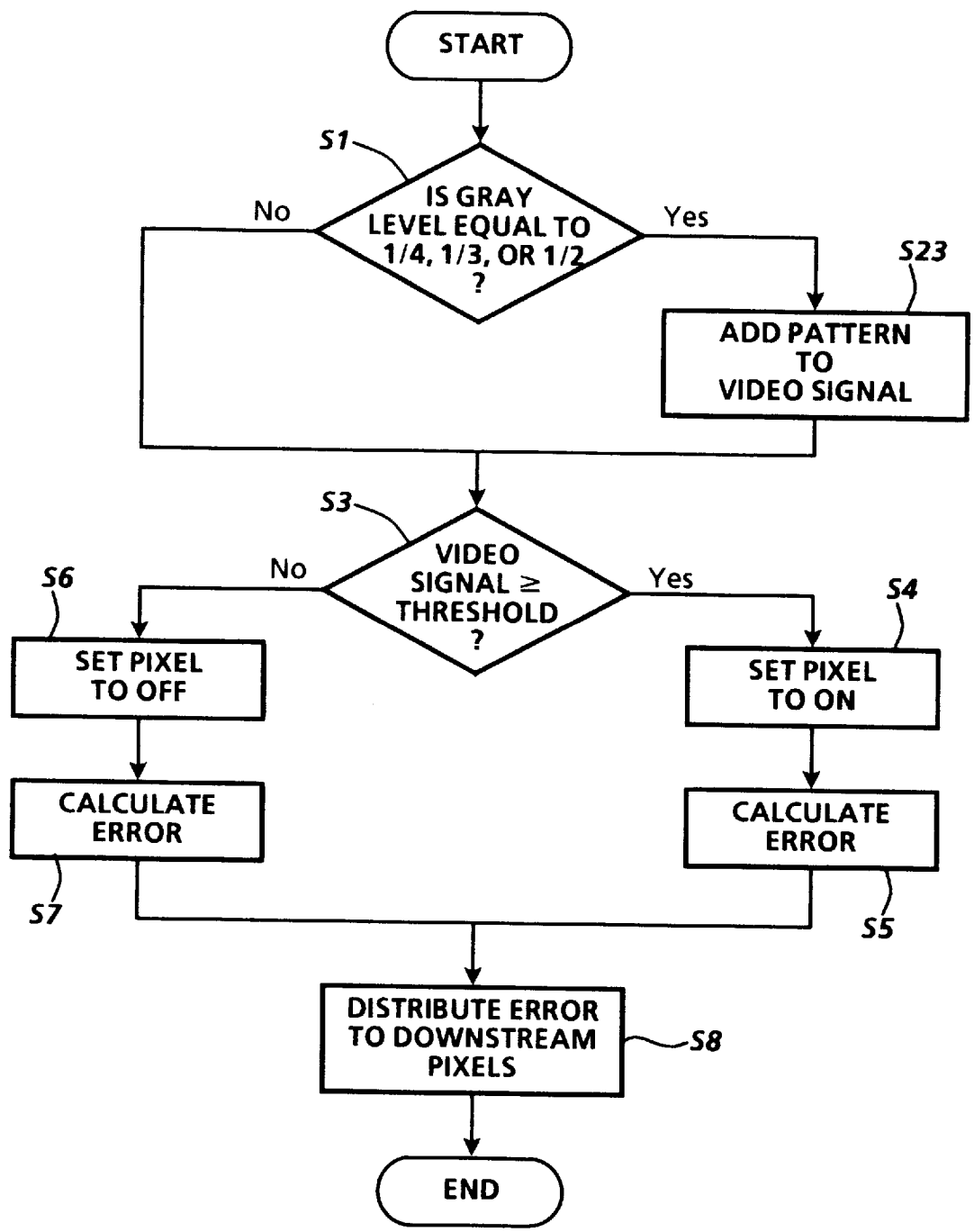
FIG. 10 shows a flowchart illustrating the addition of a pattern signal to the image signal to perturb the threshold relationship according to concepts of the present invention.

FIG. 10 illustrates a third method utilized by the present invention to perturb the threshold relationship at certain grey levels. As illustrated in FIG. 10, at Step S1, it is determined whether the grey level of the image to be threshold is equal to ¼, ⅓, or ½. If the image data is equal to one of these grey levels, a predetermined pattern is added to the video signal to perturb the threshold/image signal relationship at Step S23. After the threshold signal relationship has been perturbed at Step S23 or if the image data has a grey level not equal to ¼, ⅓, or ½, it is determined whether the video signal is greater than or equal to the threshold value at Step S3. The remaining steps are the same as described above with respect to FIG. 7.

Figure 11:
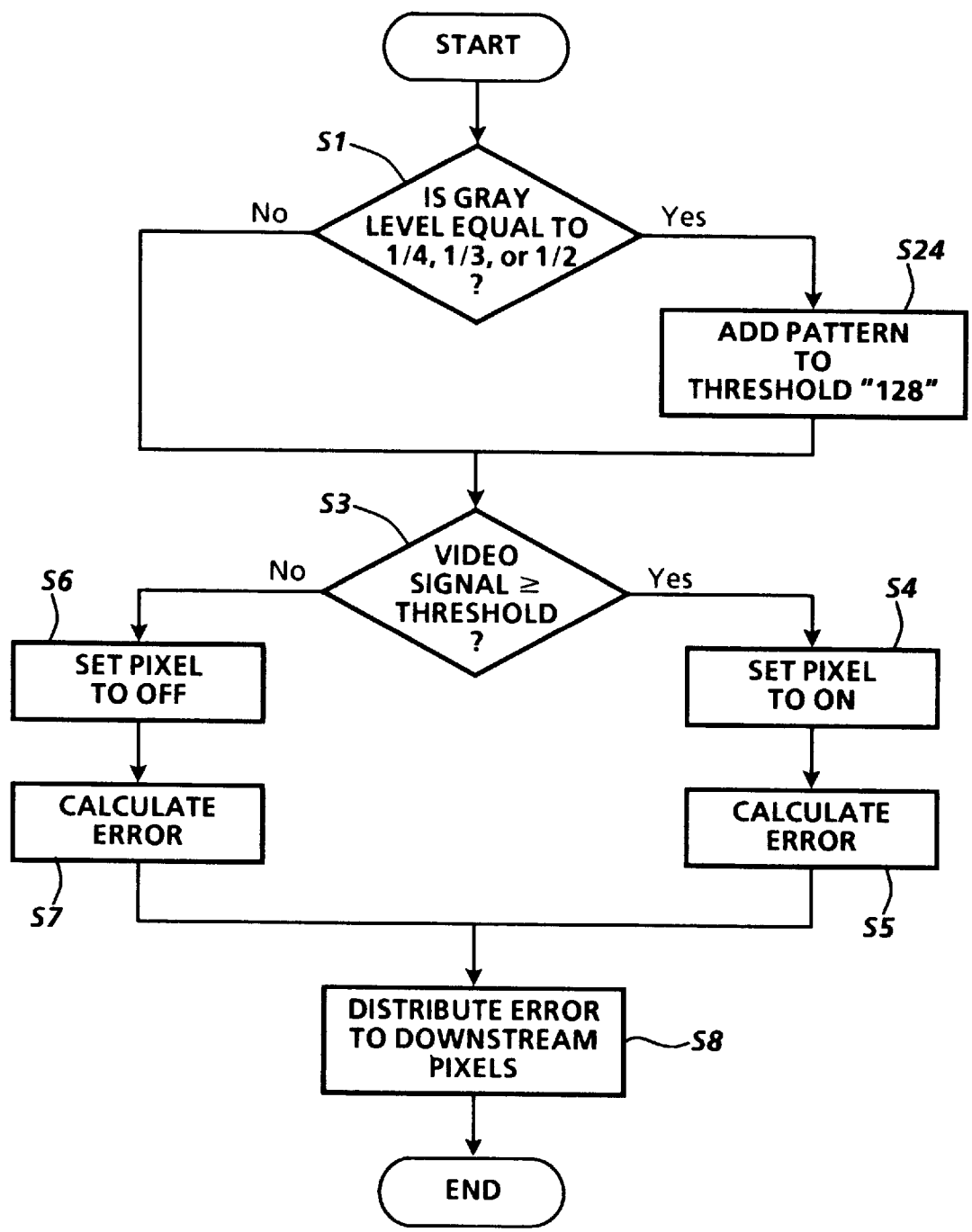
FIG. 11 shows a flowchart illustrating the adding of a pattern signal to the threshold signal to perturb the threshold relationship according to the concepts of the present invention.

FIG. 11 illustrates a fourth method utilized by the present invention to perturb the threshold relationship at certain grey levels. As illustrated in FIG. 11, at Step S1, it is determined whether the grey level of the image to be threshold is equal to ¼, ⅓, or ½. If the image data is equal to one of these grey levels, a predetermined pattern is added to the threshold signal to perturb the threshold/image signal relationship at Step S24. After the threshold signal relationship has been perturbed at Step S24 or if the image data has a grey level not equal to ¼, ⅓, or ½, it is determined whether the video signal is greater than or equal to the threshold value at Step S3. The remaining steps are the same as described above with respect to FIG. 7.

It is noted that although the methods illustrated in FIGS. 7, 8, 9, 10, and 11 show Step S1 making a determination with respect to three grey level values, Step S1 can be modified from a three value decision state to a state making a determination as to what is the actual the grey level value of the image signal. With this modification,. the branch from Step S1 directly to Step S3 is eliminated, and Steps S2, S21, S22, S23, and S24 perturb the threshold/signal relationship for every pixel with a different value. In this way, the threshold/signal relationship is perturbed over the entire image wherein each possible grey level has assigned thereto an individual perturbing pattern value as in FIGS. 10 and 11 or an individual coefficient value as in FIGS. 8 and 9.

At midtone regions in an image, the possible periodic patterns for equal numbers of white and black pixels are checkerboard, vertical lines, or horizontal lines. Conventionally, the images are left to settle into one of these stages, depending of the weighting coefficients and the boundary conditions of the image processing operation. From a symmetric point of view, however, if the threshold in the error diffusion process is perturbed in a particular manner, the output from the thresholding process would be able to lock into a particular binary output having a certain state. This locking in result would effect the final appearance of the image by reducing the pattern shifting artifacts discussed above.

Figure 12:
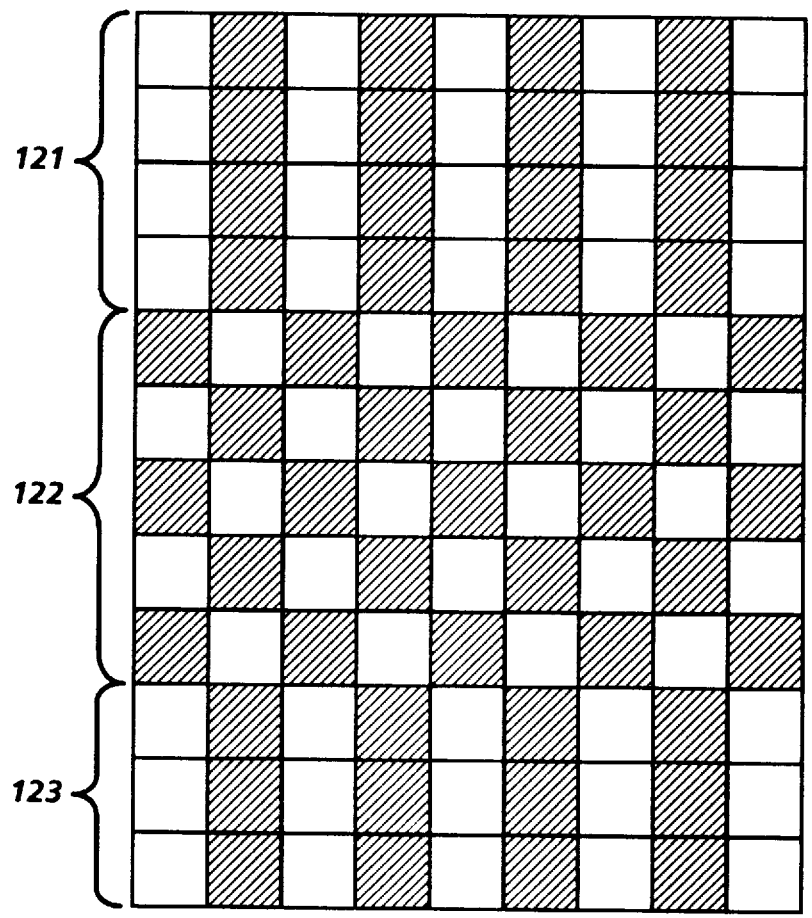
FIG. 12 shows a pixel representation illustrating the artifact of periodically repeating checkerboard and vertical line patterns in a particular grey level image region.

FIG. 12 illustrates a pattern shifting artifact occurring at a grey level corresponding to ½ or 128 when the image signal is represented by an eight bit byte. It is noted that in the section corresponding to 121, the pattern is one of vertical lines, whereas the pattern in section 122 is a checkerboard pattern. Moreover, as the image proceeds to section 123, the pattern shifts back to a vertical line pattern. It is this pattern shifting in the midtone region (a region having a grey value of 128 out of a possible 255) that creates the pattern shifting artifact that can be distracting to the actual appearance of the image.

It is noted that the shaded squares in FIG. 12 represent black pixels in the image to be reproduced and the non-shaded squares in FIG. 12 represent white pixels in the image to be reproduced. This convention is also used in FIGS. 13, 14, 15, and 16. If the present invention is utilized in a color apparatus, the shaded squares in FIG. 12 would represent to be printed pixels for a particular color (toner or ink) and the non-shaded squares in FIG. 12 would represent not to be printed pixels for a particular color (toner or ink).

Figure 13:
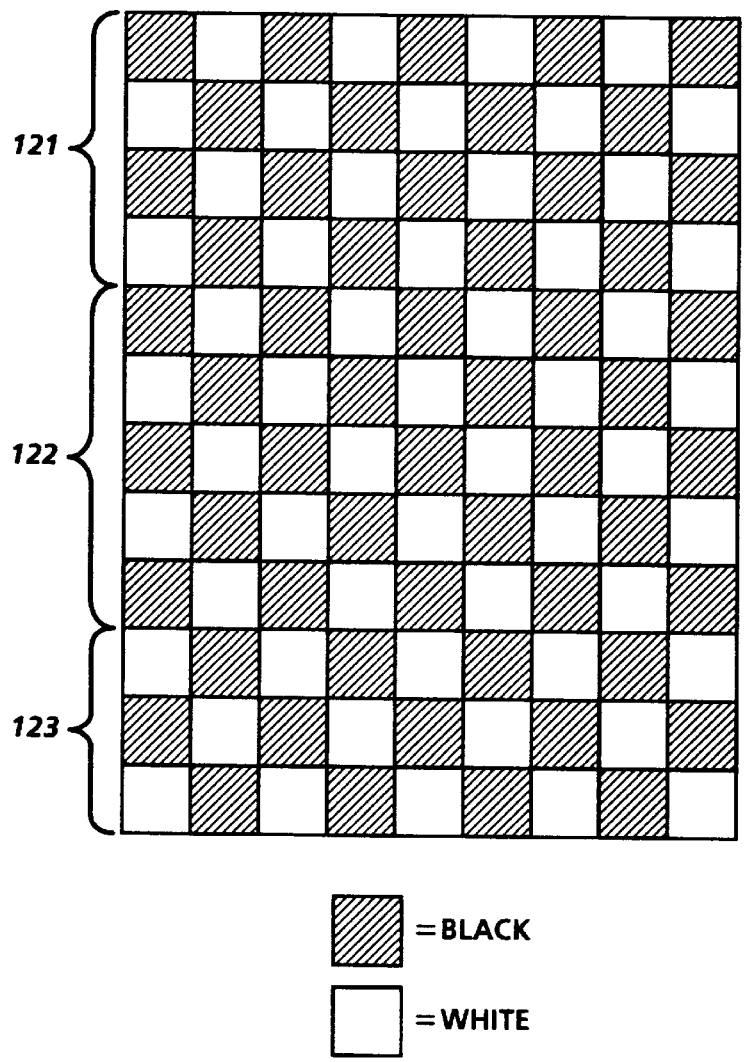
FIG. 13 shows a pixel representation wherein the artifact of FIG. 12 is eliminated by forcing the image at the particular grey level to be rendered as a checkerboard pattern.

FIG. 13 illustrates the same midtone region (½ or 128 grey level) as illustrated in FIG. 12 without the pattern shifting artifact. More specifically, the image illustrated in FIG. 13 is rendered utilizing a constant threshold at 128 which is modulated with an amplitude of 20 in a checkerboard pattern or scheme. More specifically, the actual threshold value generated for utilization by a binarization circuit would be represented by the pattern illustrated in Table 1 below.

TABLE 1

| 108 | 148 | 108 | 148 |
|-----|-----|-----|-----|
| 148 | 108 | 148 | 108 |
| 108 | 148 | 108 | 148 |
| 148 | 108 | 148 | 108 |

On the other hand, Table 2 shows the value pattern added to the image signal to implement the checkerboard pattern when the system modifies the image signal.

TABLE 2

| −20 | 20  | −20 | 20  |
|-----|-----|-----|-----|
| 20  | −20 | 20  | −20 |
| −20 | 20  | −20 | 20  |
| 20  | −20 | 20  | −20 |

Figure 14:
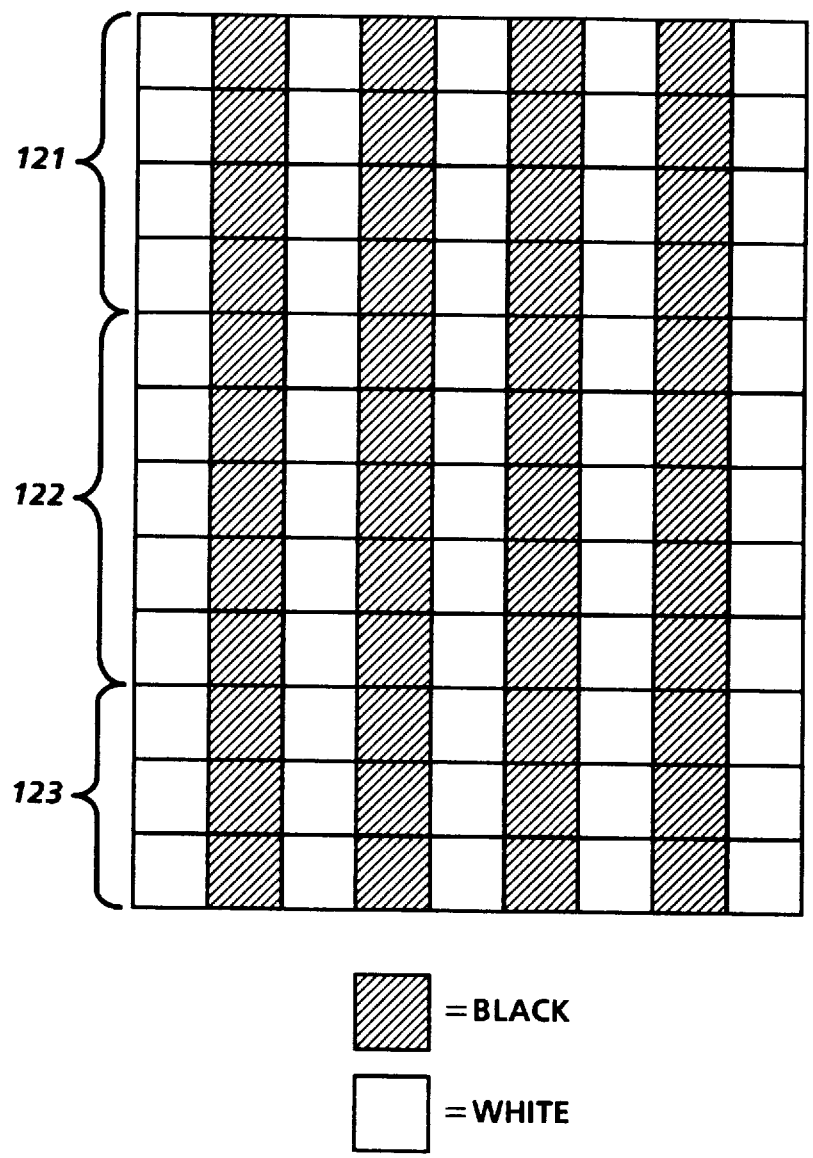
FIG. 14 shows a pixel representation illustrating the elimination of the artifact of FIG. 12 by forcing the certain grey level to be represented by a vertical line pattern.

FIG. 14 illustrates the same midtone region (½ or 128 grey level) as illustrated in FIG. 12 without the pattern shifting artifact. More specifically, the image illustrated in FIG. 14 is rendered utilizing a constant threshold at 128 which is modulated with an amplitude of 20 in a vertical line pattern or scheme. More specifically, the actual threshold value generated for utilization by a binarization circuit would be represented by the pattern illustrated in Table 3 below.

TABLE 3

| 108 | 148 | 108 | 148 |
|-----|-----|-----|-----|
| 108 | 148 | 108 | 148 |
| 108 | 148 | 108 | 148 |
| 108 | 148 | 108 | 148 |

On the other hand, Table 4 shows the value pattern added to the image signal to implement the vertical line pattern when the system modifies the image signal.

TABLE 4

| −20 | 20 | −20 | 20 |
|-----|----|-----|----|
| −20 | 20 | −20 | 20 |
| −20 | 20 | −20 | 20 |
| −20 | 20 | −20 | 20 |

It is noted that in the above Tables a row represents a fast scan direction or electronic scanning direction, whereas a column represents a slow scan direction or mechanical scanning direction.

Figure 15:
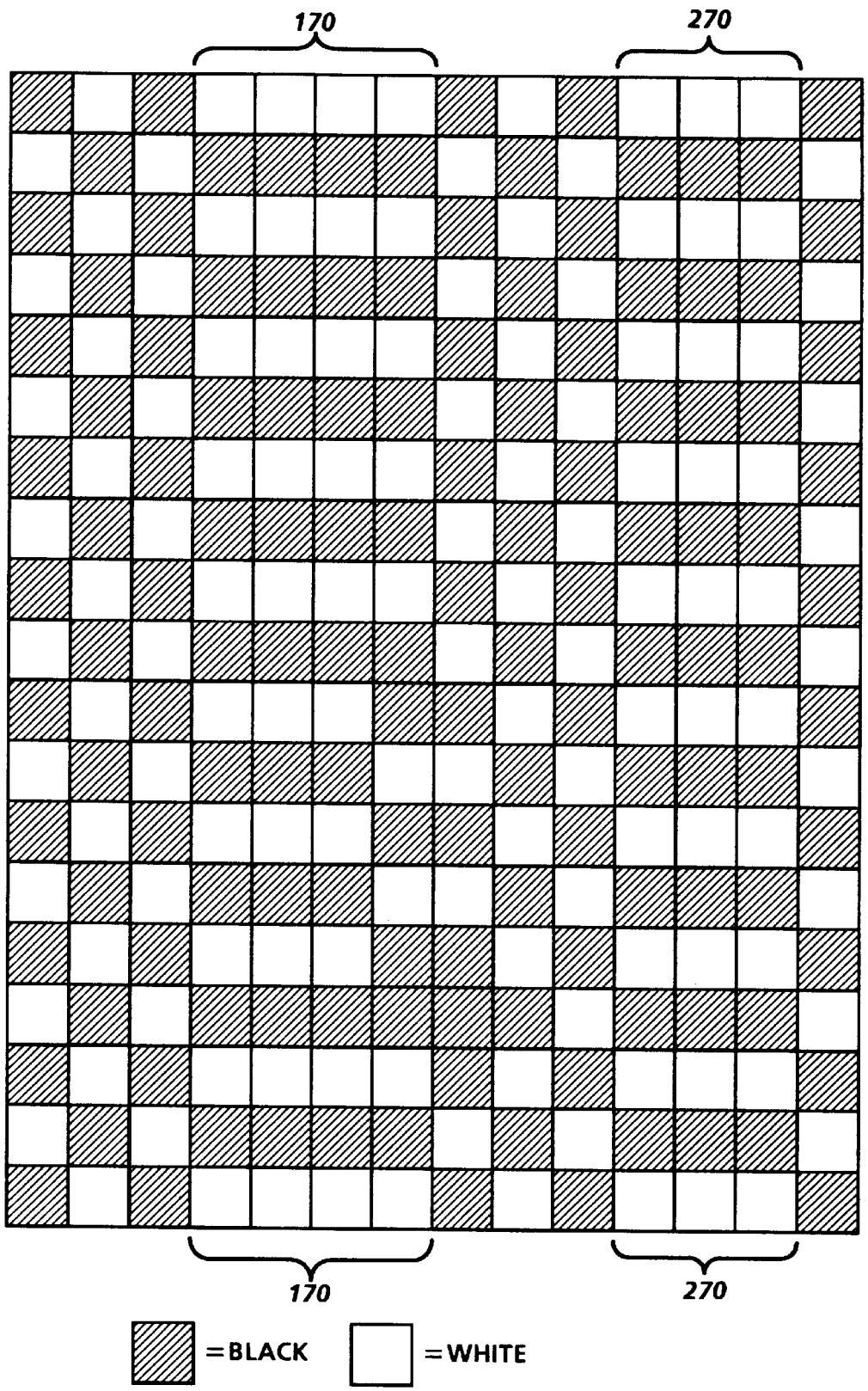
FIG. 15 shows a pixel representation of a certain grey level without threshold permutation.

FIG. 15 illustrates a pixel representation of another pattern shifting artifact in a midtone region (a grey level corresponding to 128 or ½ for an eight bit image data byte). In FIG. 15, section 170 represents an area where a predominant horizontal line pattern is found. Moreover, section 270 also represents an area having a predominant horizontal line pattern. Thus, it is noted that the pattern shifts from a horizontal line pattern in section 170 to a checkerboard pattern then back to a horizontal line pattern in 270 as one travels in a fast scan direction. This pattern shifting artifact is substantially reduced in FIG. 16.

Figure 16:
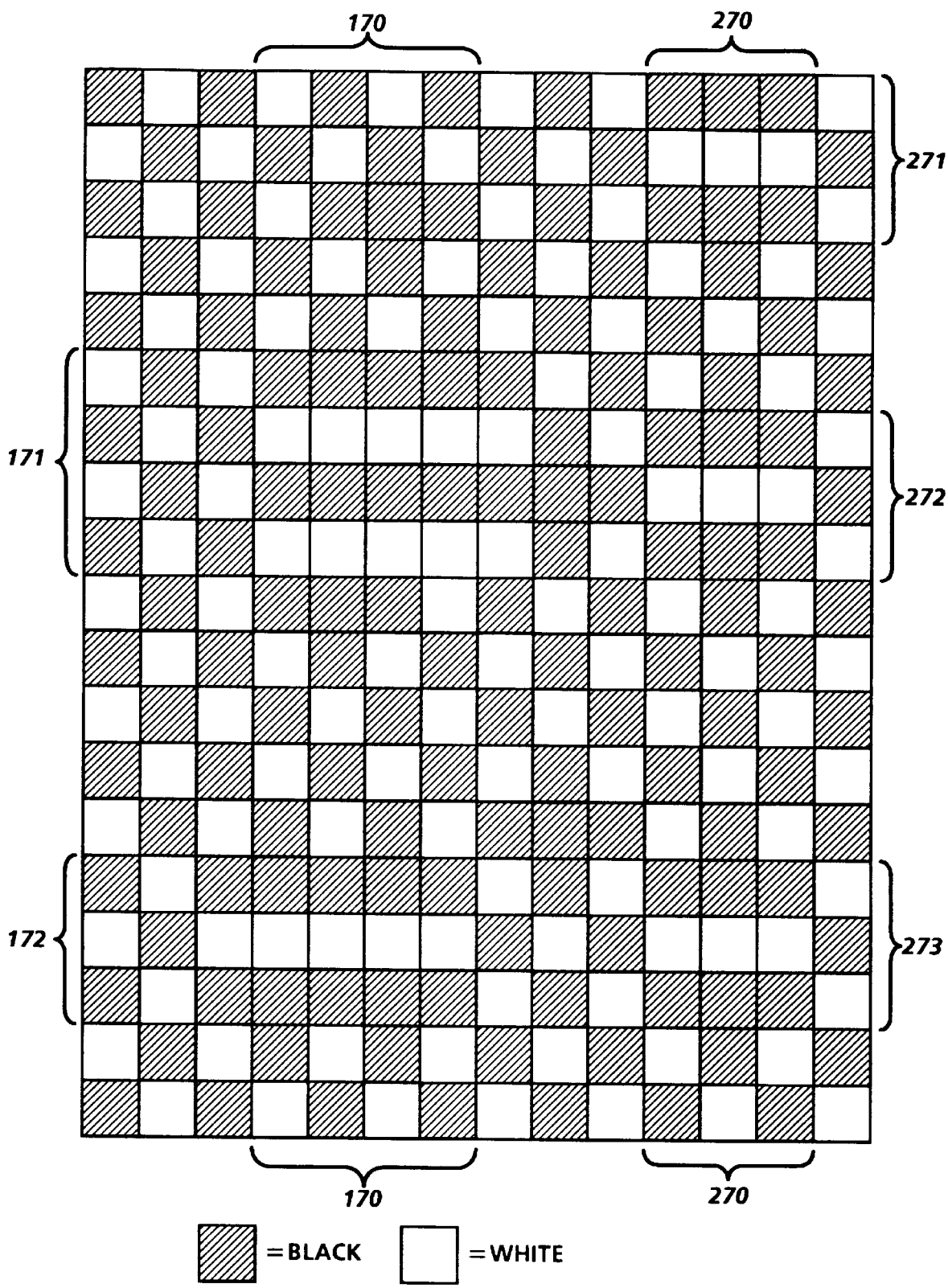
FIG. 16 shows a pixel representation illustrating the results of performing threshold permutation on the image of FIG. 15.

In FIG. 16, the midtone region (128 or ½ grey level) is rendered by perturbing the threshold/signal relationship with the inclusion of random noise. In the rendering of the image, the horizontal line patterns are restricted to the areas where sections 171 and 172 overlap section 170 or the areas which correspond to the overlapping of section 270 with sections 271, 272, and 273. The addition of random noise for a particular grey level enables the image to be rendered with a substantial reduction in the pattern shifting artifact.

An additional benefit of allowing both the location and the intensity of the threshold relationship perturbation to be programmable is a flexibility to properly apply the correct amount of perturbing noise to any type of preprocessed image prior to applying error diffusion. Preprocessing operations include tonal reproduction curve (TRC) input mapping, gain and offset adjustment, spot overlap compensation, etc. These preprocessing operations all tend to shift objectional periodic patterns to input grey level location other than what has been conventionally expected.

Moreover, the noise look-up table can be uniquely programmed and optimized to render images with good quality corresponding to any of the situations described above. More specifically, if the image is preprocessed utilizing a TRC input mapping and gain and offset adjustment, the artifact of pattern shifting can be centered at an input grey level of around 220. Thus, knowing that the pattern shifting artifact has been centered at a different input grey level, the noise look-up table can be programmed to inject random noise into the threshold/video signal relationship when the image signal is at a grey level around the new pattern shifting grey level. Thus, the programmability of the noise look-up table allows the present invention to be readily adaptable to any printing situation.

The present invention has been described in detail above; however, various modifications can be implemented without departing from the spirit of the present invention. For example, the preferred embodiment of the present invention has been described with respect to a binary printing system; however, this perturbing system can be applied to any situation where multi-bit image data byte is to be reduced or converted to an image data byte having less bits. Moreover, the perturbation method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level image output terminal or higher.

Lastly, the present invention has been described with respect to a monochrome or black/white environment. However, the concepts of the present invention are readily applicable to a color environment. Namely, the perturbation process of the present invention can be applied to each color space value representing the color pixel.

In recapitulation, the present invention provides a process for eliminating pattern shifting artifacts by perturbing the threshold/image signal relationship. The perturbation is based on the grey value of the image data and/or the pixel location of the image data. Moreover, the perturbation is programmable allowing flexibility and adaptability to any situation.

While the present invention has been described with reference to various embodiments disclosed herein before, it is not to be combined to the detail set forth above, but is intended to cover such modifications or changes as made within the scope of the attached claims.

What is claimed is:

1. A system for processing image data having a multi-level grey signal having a first number of grey levels, comprising:

threshold means for generating a threshold value;

conversion means for generating an output having a second number of grey levels based on a relationship between the threshold value and a modified multi-level grey signal, the second number of grey levels being less than the first number of grey levels, and for generating an error corresponding to the relationship between the threshold value and the modified multi-level grey signal;

error diffusion means for adding an error value, corresponding to a predetermined number of errors previously generated by said conversion means, to the multi-level grey signal to generate the modified multi-level grey signal; and perturbing means for perturbing, according to a grey level of the multi-level grey signal, the relationship between the threshold value and the modified multi-level grey signal by changing the threshold value by a predetermined value, said predetermined value is one of a plurality of values forming a predetermined pattern associated with a particular grey level, said predetermined value being added to the threshold value is determined from a pixel location and grey level of the multi-level grey signal, prior to being modified, being processed by said conversion means, thereby effecting the output and the error from said conversion means.

2. The system as claimed in claim 1, wherein the predetermined pattern is a checkerboard pattern.

3. The system as claimed in claim 1, wherein the predetermined pattern is a vertical line pattern.

4. The system as claimed in claim 1, wherein said perturbing means perturbs the relationship when the grey level is ½.

5. The system as claimed in claim 1, wherein said perturbing means perturbs the relationship when the grey level is ¼.

6. The system as claimed in claim 1, wherein said perturbing means perturbs the relationship when the grey level is ⅓.

7. The system as claimed in claim 1, wherein said perturbing means administers a distinct perturbation to the relationship for each grey level.

8. A system for processing image data having a multi-level grey signal having a first number of grey levels, comprising:

threshold means for generating a threshold value;

conversion means for generating an output having a second number of grey levels based on a relationship between the threshold value and a modified multi-level grey signal, the second number of grey levels being less than the first number of grey levels, and for generating an error corresponding to the relationship between the threshold value and the modified multi-level grey signal;

error diffusion means for adding an error value, corresponding to a predetermined number of errors previously generated by said conversion means, to the multi-level grey signal to generate the modified multi-level grey signal: and perturbing means for perturbing, according to a grey level of the multi-level grey signal, the relationship between the threshold value and the modified multi-level grey signal by changing the modified multi-level grey signal by a predetermined value, said predetermined value is one of a plurality of values forming a predetermined pattern associated with a particular grey level, said predetermined value being added to the modified multi-level grey signal is determined from a pixel location and grey level of the multi-level grey signal, prior to being modified, being processed by said conversion means, thereby effecting the output and the error from said conversion means.

9. The system as claimed in claim 8, wherein the predetermined pattern is a checkerboard pattern.

10. The system as claimed in claim 8, wherein the predetermined pattern is a vertical line pattern.

11. The system as claimed in claim 8 wherein said perturbing means administers a distinct perturbation to the relationship for each grey level.

12. A method of processing image data having a multi-level grey signal having a first number of grey levels, comprising the steps of:

(a) generating a threshold value;

(b) generating an output having a second number of grey levels based on a relationship between the threshold value and a modified multi-level grey signal, the second number of grey levels being less than the first number of grey levels;

(c) generating an error corresponding to the relationship between the threshold value and the modified multi-level grey signal;

(d) adding an error value, corresponding to a predetermined number of errors previously generated by said step (c), to the multi-level grey signal to generate the modified multi-level grey signal:

(e) perturbing according to a grey level of the multi-level grey signal the relationship, by a predetermined value, between the threshold value and the modified multi-level grey, thereby effecting the output of said step (b) and the error of said step (c);

(f) selecting a predetermined value from one of a plurality of values forming a predetermined pattern associated with a particular grey level; and (g) determining the predetermined value from a pixel location and grey level of the multi-level grey signal being processed.

13. The method as claimed in claim 12, wherein said step (f) selects the predetermined pattern from a checkerboard pattern.

14. The method as claimed in claim 12, wherein said step (f) selects the predetermined pattern from a vertical line pattern.

15. A system for eliminating pattern shifting artifacts in a printed image, comprising:

image means for generating image data having a multi-level grey signal;

programmable multi-level grey signal modifying means for modifying an error diffused multi-level grey signal by a predetermined value according to the grey level of the multi-level grey signal to generate a modified multi-level grey signal;

binary means for outputting a binary pixel value according to a relationship between the modified multi-level grey signal from said programmable multi-level grey signal modifying means and a threshold value, for generating an error corresponding to the relationship, and for diffusing the error to neighboring pixels; and error diffusion means for adding an error value, corresponding to a predetermined number of errors previously generated by said binary means, to the multi-level grey signal to generate the error diffused multi-level grey signal.

16. A system for processing image data having a multi-level grey signal having a first number of grey levels, comprising:

threshold means for generating a threshold value;

conversion means for generating an output having a second number of grey levels based on a relationship between a modified threshold value and the multi-level grey signal, the second number of grey levels being less than the first number of grey levels, and for generating an error corresponding to the relationship between the modified threshold value and the multi-level grey signal;

error diffusion means for adding an error value, corresponding to a predetermined number of errors previously generated by said conversion means, to the threshold value to generate the modified threshold value; and perturbing means for perturbing, according to a grey level of the multi-level grey signal, the relationship between the modified threshold value and the multi-level grey signal by changing the modified threshold value by a predetermined value, said predetermined value is one of a plurality of values forming a predetermined pattern associated with a particular grey level, said predetermined value being added to the modified threshold value is determined from a pixel location and grey level of the multi-level grey signal being processed by said conversion means, thereby effecting the output and the error from said conversion means.

17. A system for processing image data having a multi-level grey signal having a first number of grey levels, comprising:

threshold means for generating a threshold value;

conversion means for generating an output having a second number of grey levels based on a relationship between a modified threshold value and the multi-level grey signal, the second number of grey levels being less than the first number of grey levels, and for generating an error corresponding to the relationship between the modified threshold value and the multi-level grey signal;

error diffusion means for adding an error value, corresponding to a predetermined number of errors previously generated by said conversion means, to the threshold value to generate the modified threshold value; and perturbing means for perturbing, according to a grey level of the multi-level grey signal, the relationship between the modified threshold value and the multi-level grey signal by changing the multi-level grey signal by a predetermined value, said predetermined value is one of a plurality of values forming a predetermined pattern associated with a particular grey level, said predetermined value being added to the multi-level grey signal is determined from a pixel location and grey level of the multi-level grey signal being processed by said conversion means, thereby effecting the output and the error from said conversion means.

18. A system for processing image data having a multi-level grey signal having a first number of grey levels, comprising:

threshold means for generating a threshold value;

conversion means for generating an output having a second number of grey levels based on a relationship between the threshold value and a modified multi-level grey signal, the second number of grey levels being less than the first number of grey levels, and for generating an error corresponding to the relationship between the threshold value and the modified multi-level grey signal;

error diffusion means for adding an error value, corresponding to a predetermined number of errors previously generated by said conversion means, to the multi-level grey signal to generate the modified multi-level grey signal; and perturbing means for perturbing, according to a grey level of the multi-level grey signal, the relationship between the threshold value and the modified multi-level grey signal by changing the threshold value by a weighted random noise signal;

said perturbing means including, a random noise generator to produce random noise, a weighting value generator to produce a predetermined value, said predetermined value being one of a plurality of values forming a predetermined pattern associated with a particular grey level, said predetermined value being determined from a pixel location and grey level of the multi-level grey signal being processed by said conversion means, and a multiplier to generate said weighted random noise signal from said random noise and said predetermined value.

19. A system for processing image data having a multi-level grey signal having a first number of grey levels, comprising:

threshold means for generating a threshold value;

conversion means for generating an output having a second number of grey levels based on a relationship between the threshold value and a modified multi-level grey signal, the second number of grey levels being less than the first number of grey levels, and for generating an error corresponding to the relationship between the threshold value and the modified multi-level grey signal;

error diffusion means for adding an error value, corresponding to a predetermined number of errors previously generated by said conversion means, to the multi-level grey signal to generate the modified multi-level grey signal; and perturbing means for perturbing, according to a grey level of the multi-level grey signal, the relationship between the threshold value and the modified multi-level grey signal by changing the threshold value by a weighted random noise signal;

said perturbing means including, a random noise generator to produce random noise, a weighting value generator to produce a predetermined value, said predetermined value being one of a plurality of values forming a predetermined pattern associated with a particular grey level, said predetermined value being determined from a pixel location and grey level of the multi-level grey signal being processed by said conversion means, and a multiplier to generate said weighted random noise signal from said random noise and said predetermined value.

20. A system for processing image data having a multi-level grey signal having a first number of grey levels, comprising:

threshold means for generating a threshold value;

conversion means for generating an output having a second number of grey levels based on a relationship between a modified threshold value and the multi-level grey signal, the second number of grey levels being less than the first number of grey levels, and for generating an error corresponding to the relationship between the modified threshold value and the multi-level grey signal;

error diffusion means for adding an error value, corresponding to a predetermined number of errors previously generated by said conversion means, to the threshold value to generate the modified threshold value; and perturbing means for perturbing, according to a grey level of the multi-level grey signal, the relationship between the modified threshold value and the multi-level grey signal by changing the multi-level grey signal by a weighted random noise signal;

said perturbing means including, a random noise generator to produce random noise, a weighting value generator to produce a predetermined value, said predetermined value being one of a plurality of values forming a predetermined pattern associated with a particular grey level, said predetermined value being determined from a pixel location and grey level of the multi-level grey signal being processed by said conversion means, and a multiplier to generate said weighted random noise signal from said random noise and said predetermined value.

21. A system for processing image data having a multi-level grey signal having a first number of grey levels, comprising:

threshold means for generating a threshold value;

conversion means for generating an output having a second number of grey levels based on a relationship between a modified threshold value and the multi-level grey signal, the second number of grey levels being less than the first number of grey levels, and for generating an error corresponding to the relationship between the modified threshold value and the multi-level grey signal;

error diffusion means for adding an error value, corresponding to a predetermined number of errors previously generated by said conversion means, to the threshold value to generate the modified threshold value; and perturbing means for perturbing, according to a grey level of the multi-level grey signal, the relationship between the threshold value and the modified multi-level grey signal by changing the modified threshold value by a weighted random noise signal;

said perturbing means including, a random noise generator to produce random noise, a weighting value generator to produce a predetermined value, said predetermined value being one of a plurality of values forming a predetermined pattern associated with a particular grey level, said predetermined value being determined from a pixel location and grey level of the multi-level grey signal being processed by said conversion means, and a multiplier to generate said weighted random noise signal from said random noise and said predetermined value.

* * * * *